United States Patent
Hatano

(10) Patent No.: US 6,549,185 B1
(45) Date of Patent: *Apr. 15, 2003

(54) DISPLAY APPARATUS AND METHOD FOR DRIVING A LIQUID CRYSTAL DISPLAY

(75) Inventor: Takuji Hatano, Suita (JP)

(73) Assignee: Minola Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/713,929

(22) Filed: Sep. 13, 1996

(30) Foreign Application Priority Data

Sep. 14, 1995 (JP) .............................. 7-236919
Aug. 16, 1996 (JP) .............................. 8-216198

(51) Int. Cl.[7] ................................. G09G 3/36
(52) U.S. Cl. .......................... 345/94; 345/97; 349/33; 349/100
(58) Field of Search ............... 345/55, 84, 87, 345/97, 94, 96, 204, 208, 210; 349/33, 100

(56) References Cited

U.S. PATENT DOCUMENTS

| | | | | |
|---|---|---|---|---|
| 4,571,585 A | * | 2/1986 | Stein et al. .................... | 345/96 |
| 4,688,900 A | | 8/1987 | Doane et al. | |
| 4,705,345 A | * | 11/1987 | Ayliffe et al. ................. | 345/97 |
| 4,898,456 A | * | 2/1990 | Okada et al. ................ | 349/172 |
| 5,251,048 A | | 10/1993 | Doane et al. | |
| 5,274,484 A | * | 12/1993 | Mochizuki et al. ........... | 345/87 |
| 5,422,033 A | * | 6/1995 | Mochizuki et al. ..... | 252/299.01 |
| 5,437,811 A | | 8/1995 | Doane et al. | |
| 5,521,727 A | * | 5/1996 | Inaba et al. ................... | 359/56 |
| 5,598,229 A | * | 1/1997 | Okada et al. ............... | 348/792 |
| 5,608,420 A | * | 3/1997 | Okada ......................... | 345/89 |
| 5,699,074 A | | 12/1997 | Sutherland et al. .......... | 345/90 |

FOREIGN PATENT DOCUMENTS

| | | |
|---|---|---|
| JP | 6-194627 | 7/1994 |
| JP | 7-43690 | 2/1995 |

OTHER PUBLICATIONS

Huang, X.–Y., "Dynamic Drive for Bistable Reflective Cholesteric Displays: A Rapid Addressing Scheme," SID 95 Digest, pp. 347–354.

X.–Y. Huang, et al., "High–Performance Dynamic Drive Scheme for Bistable Reflective Cholesteric Displays", published May 13, 1996 pp. 359–362.

* cited by examiner

Primary Examiner—Dennis-Doon Chow
Assistant Examiner—Amr Awad
(74) Attorney, Agent, or Firm—McDermott, Will & Emery

(57) ABSTRACT

A display apparatus includes a liquid crystal display which has a pair of plates each provided with an electrode and a liquid crystal layer retained between the plates, and a driver which is connected to said liquid crystal display for applying a voltage pulse to the electrodes. The driver applies a first voltage pulse for changing the state of the liquid crystal layer, and further, after elapsing of a predetermined time, applies a second voltage pulse for setting the liquid crystal layer to a stable state.

46 Claims, 15 Drawing Sheets

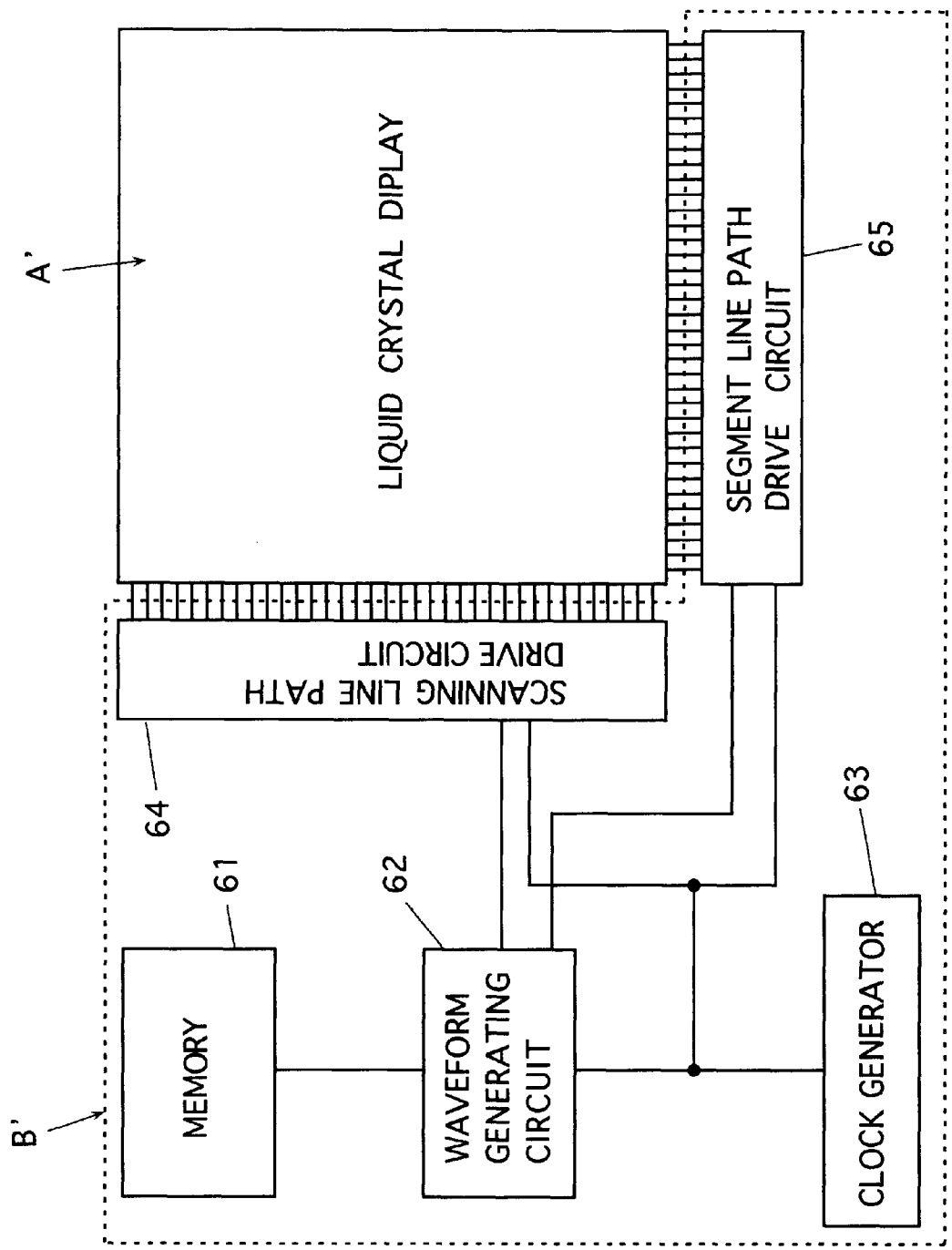

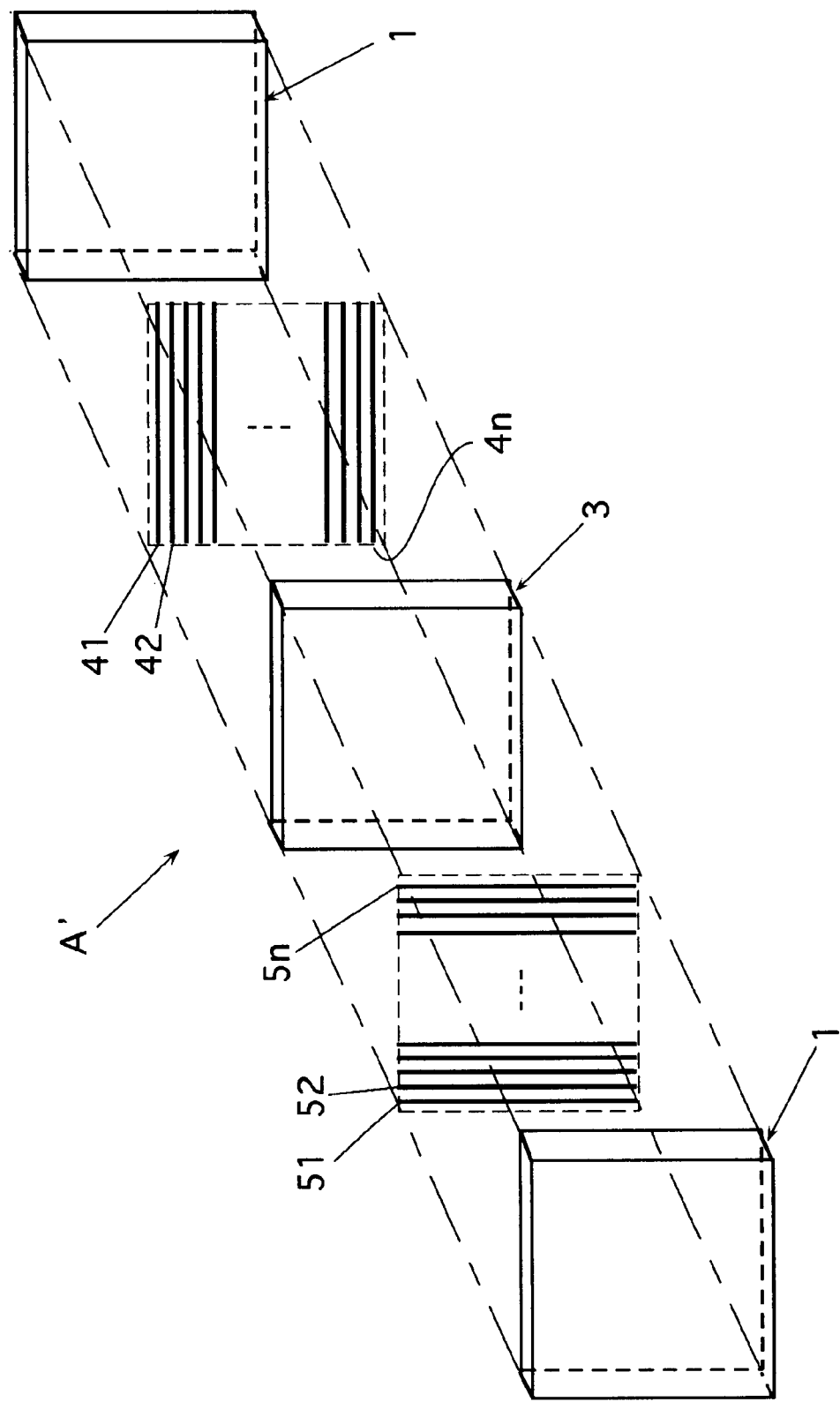

DISPLAY APPARATUS AND METHOD FOR DRIVING A LIQUID CRYSTAL DISPLAY

BACKGROUND OF THE INVENTION

1. Field of the Invention

The present invention relates to a display apparatus, and in particular to a display apparatus using a liquid crystal display and a method for driving the liquid crystal display. More specifically, the invention relates to a display apparatus using a liquid crystal display containing liquid crystal and resin as well as a method for driving this liquid crystal display.

2. Description of the Related Art

As proposed in U.S. Pat. No. 4,688,900, liquid crystal display having particular liquid crystal and resin does not require a polarizer and preparation of a cell, and therefore it has been expected to apply it to a liquid crystal panel having a large area and a high brightness.

U.S. Pat. No. 5,437,811 has disclosed that a liquid crystal display, which comprises chiral nematic liquid crystal having a positive dielectric anisotropy and resin of 10% by weight with respect to a total weight, exhibits a bistability of a transparent state and an opaque state between the voltage-on and voltage-off conditions.

Further, U.S. Pat. No. 5,251,048 has disclosed a display apparatus, which uses a liquid crystal display proposed in the foregoing U.S. Pat. No. 5,437,811, and performs display by a-line-at-a-time matrix driving.

Thus, in this display apparatus, a liquid crystal display is retained between two transparent plates. A plurality of parallel scanning line paths are arranged on an inner side of one of the transparent plates, and a plurality of parallel segment line paths perpendicular to the scanning line paths are arranged on an inner side of the other transparent plate. In the liquid crystal display retained between the transparent plates, therefore, a potential difference corresponding to a difference between a voltage applied to the scanning line path and a voltage applied to the segment line path occurs at a point (picture element) where the scanning line path and the segment line path cross each other. In this manner, a transmissive state and an opaque state are selected at each picture element. More specifically, a particular voltage is applied to a selected scanning line path. This voltage can cooperate with a voltage applied to the segment line paths crossing the selected scanning line path, and thereby can set each of the picture elements on the selected scanning line path to a transmissive state or a scattering (opaque) state. All the scanning line paths other than the above are supplied with another voltage, which cooperates with a voltage applied to the segment line paths crossing these scanning line paths and thereby does not change the state of corresponding picture elements on the scanning line paths. This selection of the scanning line path is successively repeated, whereby the whole screen can be redrawn.

In the display apparatus disclosed in U.S. Pat. No. 5,251,048, however, a long time is required for changing the state of each picture element on the selected scanning line path, and more specifically, a time of about 100 msec is generally required for change the state of each picture element from a transmissive state to a stable scattering state and vice versa. Therefore, if a speed of selection of the scanning line path is increased, a new scanning line path is selected before picture elements on a last selected scanning line path attain a stable state, so that the picture elements on the last selected scanning line path attain neither a transmissive state nor a scattering state, and are stabilized in a state intermediate these states. Thus, rapid driving of this display apparatus is difficult.

Further, in this display apparatus, each picture element cannot be stabilized at an intended intermediate state, so that it is difficult to display an image with multiple gradation.

SUMMARY OF THE INVENTION

It is an object of the invention to provide a display apparatus using a liquid crystal display and allowing rapid driving as well as a method for driving the display apparatus allowing rapid driving and particularly the liquid crystal display of the same.

It is also an object of the invention to provide a display apparatus capable of displaying an image with multiple gradation by a liquid crystal display as well as a method for driving the display apparatus capable of displaying an image with multiple gradation and in particular the liquid crystal display of the same.

In order to achieve the above objects, the present invention provides display apparatuses of the following first, second and third types.

First Type: A display apparatus including a liquid crystal display having a pair of plates with electrodes and a liquid crystal layer retained between the plates, and a driver connected to the liquid crystal display to apply voltage pulses to the electrodes, the driver applying a first voltage pulse for changing a state of the liquid crystal layer and after a predetermined lapse of time further applying a second voltage pulse to set the liquid crystal layer to a stable state.

Second Type: A display apparatus including a liquid crystal display having a pair of plates with electrodes and a liquid crystal layer retained between the plates, a driver connected to the liquid crystal display for applying a first voltage pulse and a second voltage pulse following the first voltage pulse, and a controller connected to the driver to adjust a width of the second voltage pulse in accordance with desired gradation.

Third Type: A display apparatus including a liquid crystal display having a pair of plates with electrodes and a liquid crystal layer retained between the plates, a driver connected to the liquid crystal display for applying a first voltage pulse and a plurality of second voltage pulses following the first voltage pulse, and a controller connected to the driver to adjust levels of the second voltage pulses in accordance with desired gradation.

In order to achieve the above objects, the present invention provides the following method for driving a liquid crystal display.

A method for driving a liquid crystal display having a pair of plates with electrodes and a liquid crystal layer retained between the plates, including the steps of applying a first voltage pulse to the electrodes of the liquid crystal display to change a state of the liquid crystal layer, and applying, upon elapsing of a predetermined time after application of the first voltage pulse, a second voltage pulse to the electrodes to set the liquid crystal layer to a stable state.

According to the display apparatuses of the first, second and third types as well as the method for driving the liquid crystal display of the invention, which have been described above, one or more of magnitudes, pulse widths and pulse intervals of the first and second voltage pulses may be appropriately determined, whereby the optical state of the liquid crystal can be set to an intended state, i.e., a transmissive state, a scattering state or an intermediate state, so that the image with multiple gradation can be displayed.

A time required for stabilizing the liquid crystal at an intended optical state can be shorter than that in the conventional method in which the optical state of the liquid crystal is selected by applying only one time a voltage pulse, and the two states, i.e., transmissive and scattering states of the liquid crystal can be selected only by a slight change in magnitude and/or width of the second voltage pulse. Therefore, a scanning speed can be increased, so that rapid driving is allowed. Furthermore, the voltage applied to picture elements on unselected scanning line paths can be small.

The foregoing and other objects, features, aspects and advantages of the present invention will become more apparent from the following detailed description of the present invention and the accompanying drawings.

BRIEF DESCRIPTION OF THE DRAWINGS

FIG. 8 is a block diagram of an electric circuit in a display apparatus of another embodiment of the invention;

FIG. 9 is an exploded view of a liquid crystal display A' in the display apparatus shown in FIG. 8;

DESCRIPTION OF THE PREFERRED EMBODIMENTS

Figure 1:
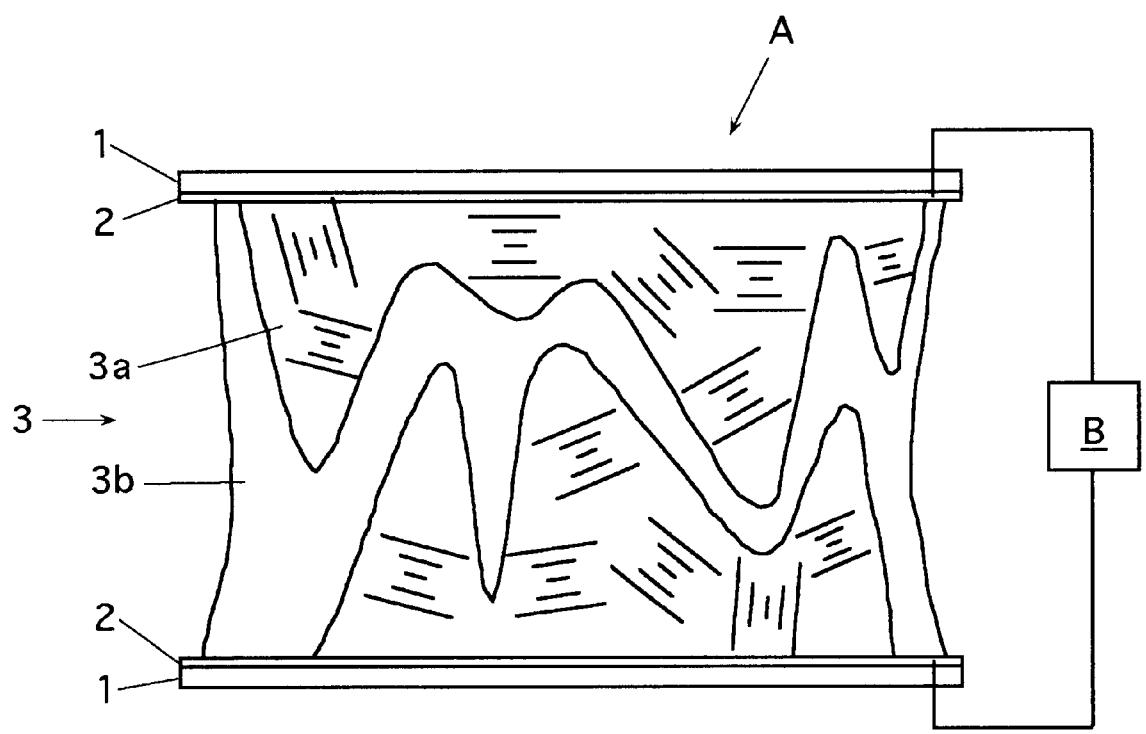
FIG. 1 schematically shows a structure of a display apparatus of an embodiment of the invention.

In the display apparatuses of the above first, second and third types as well as the method for driving the liquid crystal display, the liquid crystal layer may contain cholesteric liquid crystal. The cholesteric liquid crystal layer may be made of chiral nematic liquid crystal and resin added thereto.

In the display apparatuses of the above first, second and third types, the driver may generally be designed to apply a DC voltage in a pulse form.

In the display apparatus of the above first type, the driver may be typically designed to apply, as the first voltage pulse, a voltage having a magnitude and an application time (pulse width) which can set molecules of the liquid crystal to a homeotropic arrangement in a direction parallel to an electric field, and in other words, a voltage which can set the liquid crystal to either a transmissive state or a scattering state even if it is solely applied. Likewise, in the display apparatuses of the second and third types, the driver may be similar to the above.

In the display apparatus of the above third type, the plurality of voltage pulses forming the second voltage pulse applied by the driver may have different magnitudes and/or different pulse widths, and may not have same pulse intervals. In the display apparatuses of the first and second types, the driver may apply the second voltage pulse which is formed of the plurality of voltage pulses described above.

The display apparatus of the above first type may include a controller connected to the driver described above. The controller is provided for controlling magnitudes of the first and second voltages applied by the driver as well as timings of on/off of voltage application and others. By controlling them by the controller, the optical state of the liquid crystal layer may be selected.

The controller may be adapted to control the predetermined time interval from application of the first voltage pulse to application of the second voltage pulse in accordance with an intended transmittance of the liquid crystal display.

In particular, the controller may be adapted to control the magnitude of the second voltage pulse in accordance with an intended transmittance of the liquid crystal display.

In the display apparatuses of the first, second and third types, the liquid crystal display may be a passive matrix display having, as its electrodes, scanning line paths on one of the plates and segment line paths on the other plate. The driver may be adapted to apply voltage pulses to the scanning line paths and the segment line paths for driving the passive matrix display and apply the first and second voltage pulses to a particular one (selected line path) among the scanning line paths.

In the above case, the controller connected to the driver may be adapted to control the magnitudes of the first and second voltage pulses applied to the scanning line paths and the segment line paths in accordance with gradation of an image to be displayed.

In this case, the controller connected to the driver may be adapted to control a timing of application of the voltage pulse to the segment line paths in accordance with gradation of an image to be displayed.

In the display apparatuses of the above first, second and third types, each of the first and second voltage pulses applied by the driver may be formed of a positive voltage pulse and a negative voltage pulse. Thereby, it is possible to increase a life-time of the liquid crystal display apparatus.

Preferred embodiments of the display apparatuses according to the invention will be described below.

FIG. 1 schematically shows an example of a structure of a display apparatus according to the invention.

This apparatus includes a liquid crystal display A and a driver circuit B connected thereto. The liquid crystal display A includes a pair of glass plates 1, transparent conductive films 2 which are made of ITO and arranged on inner sides of the glass plates 1, respectively, and polymer network liquid crystal layer 3 of a first type arranged between the films 2 and including chiral nematic liquid crystal 3a and photo-curable resin 3b, which are photo-induced polymerized and phase-separated. The driver circuit B includes a driver and a controller for applying a voltage to the liquid crystal layer 3, and is connected between the transparent conductive films 2 on the paired glass plates 1.

The chiral nematic liquid crystal 3a is made of fluorine-contained tolane nematic liquid crystal (manufactured by Chisso Co., $\Delta n=0.219$ ($\lambda=589$ nm), $T_{N-1}=69.9°$ C., $V_{90}=2.29$ V, $\eta_{20}=30.6$ cps) and smectic A liquid crystal S2 (manufactured by Merck Co.) which are 7:3 in weight ratio, and further contains chiral substance S811 (manufactured by Merck Co.) at 17.4% by weight with respect to a total weight. The chiral nematic liquid crystal 3a has a selective reflection wavelength of 1.1 $\mu$m, and exhibits a cholesteric phase at a room temperature.

The photo-curable resin 3b is ultraviolet-curable resin monomer R128H (manufactured by Nippon Kayaku Co.).

In the process of preparing the display apparatus described above, the paired glass plates 1 covered with the transparent conductive films 2 are assembled to oppose the transparent conductive films 2 to each other with a spacer of 20 $\mu$m therebetween. A space between the glass plates is filled with a mixture containing the chiral nematic liquid crystal 3a and the photo-curable resin monomer 3b at a ratio of 83:17. This mixture is cured by irradiation of ultraviolet rays at 15 mW/cm$^2$ to cause phase-separation. In this manner, the liquid crystal display A is completed. The driver circuit B is connected to a position between the transparent conductive films 2 of the liquid crystal display A.

In connection with manufacturing of the liquid crystal display described above, the applicant has already filed U. S. patent application Ser. No. 08/555299.

In this display apparatus, the driver circuit B is used, and a voltage of 130 V taking a form of a pulse of 10 msec is applied to the liquid crystal layer 3 via the transparent conductive films 2, whereby the liquid crystal layer attains a transmissive state. If a voltage of 80 V taking a form of a pulse of 10 msec is applied, the liquid crystal layer attains a scattering state. These two states are stably held for several months or more after interruption of the voltage, and therefore the bistability is exhibited.

Figure 2:
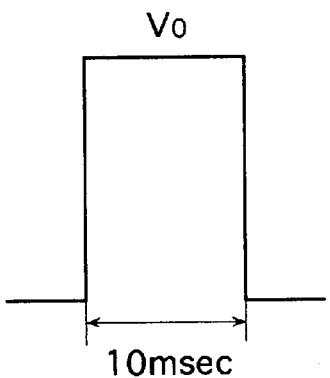
FIG. 2(A) shows an example of a pattern of applying a voltage to a liquid crystal layer in the display apparatus shown in FIG. 1.
FIG. 2(B) shows a relationship between a magnitude of an applied voltage pulse and a light transmittance of the liquid crystal layer in the cases where a voltage of the pattern shown in FIG. 2(A) is applied to the liquid crystal layer in the display apparatus shown in FIG. 1 which is in each state of the transmissive state and the scattering state.
Figure 2:
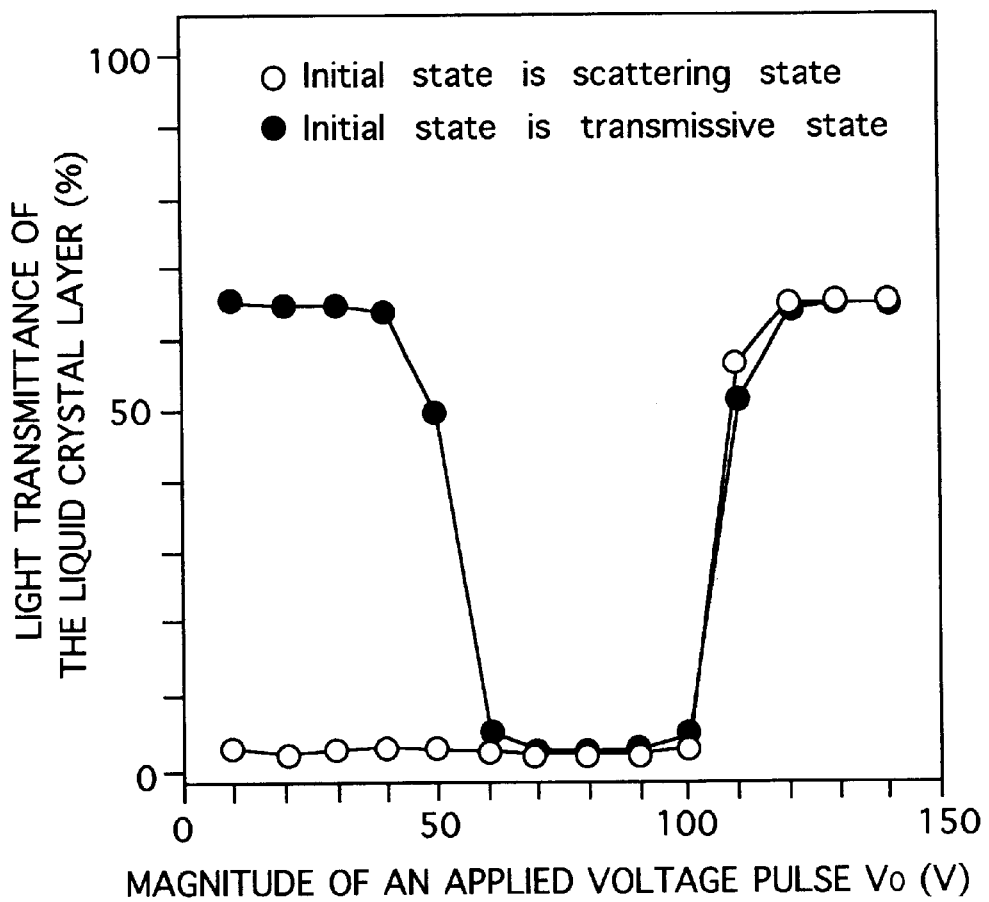

In the display apparatus described above, a voltage pulse $V_0$ (see FIG. 2(A)) of 10 msec in width is applied to the polymer network liquid crystal layer 3 of the first type in the initial state which is a transmissive state or a scattering state. In this case, a visible light transmittance of the liquid crystal layer 3 is shown in FIG. 2(B). In FIG. 2(B), blank circular marks show the light transmittance in the case where the initial state is the scattering state, and solid circular marks show the light transmittance in the case where the initial state is a transmissive state.

The visible light transmittance is measured in such a manner that a helium ion laser is irradiated toward one of the paired glass plates, and an output of the photodiode arranged at a position spaced from the other glass plate by 15 cm is measured. Measurements of the visible light transmittance, which will be described later, are also performed in the same measuring method. It is deemed that the state exhibiting the transmittance of 65% or more is the transmissive state, and the state exhibiting the transmittance of 2% or less is the scattering state.

As can be seen from FIG. 2(B), the liquid crystal layer 3 attains the transmissive state when the voltage pulse $V_0$ of 120 V or more (e.g., of 130 V) is applied thereto regardless of its initial state, and attains the scattering opaque state when the voltage pulse $V_0$ between 60 V and 100 V (e.g., of 80 V) is applied thereto. When the voltage pulse of 40 V or less (e.g., of 30 V) is applied, it does not change from the initial state.

From the above, it can be found that the polymer network liquid crystal layer of the first type can be selectively set to the transmissive state and the scattering state, regardless of the initial state, by controlling the magnitude of the applied voltage pulse.

Figure 3A:
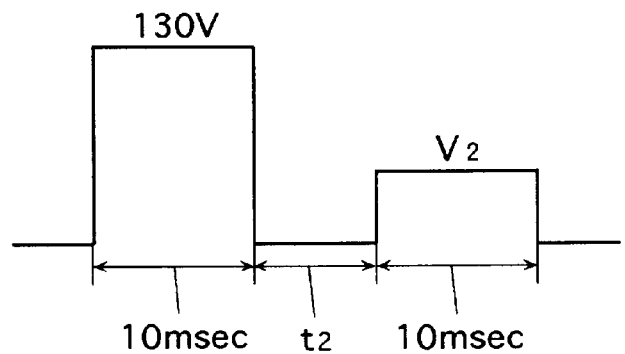
FIG. 3(A) shows another example of a pattern of applying a voltage to the liquid crystal layer in the display apparatus shown in FIG. 1.
Figure 3B:
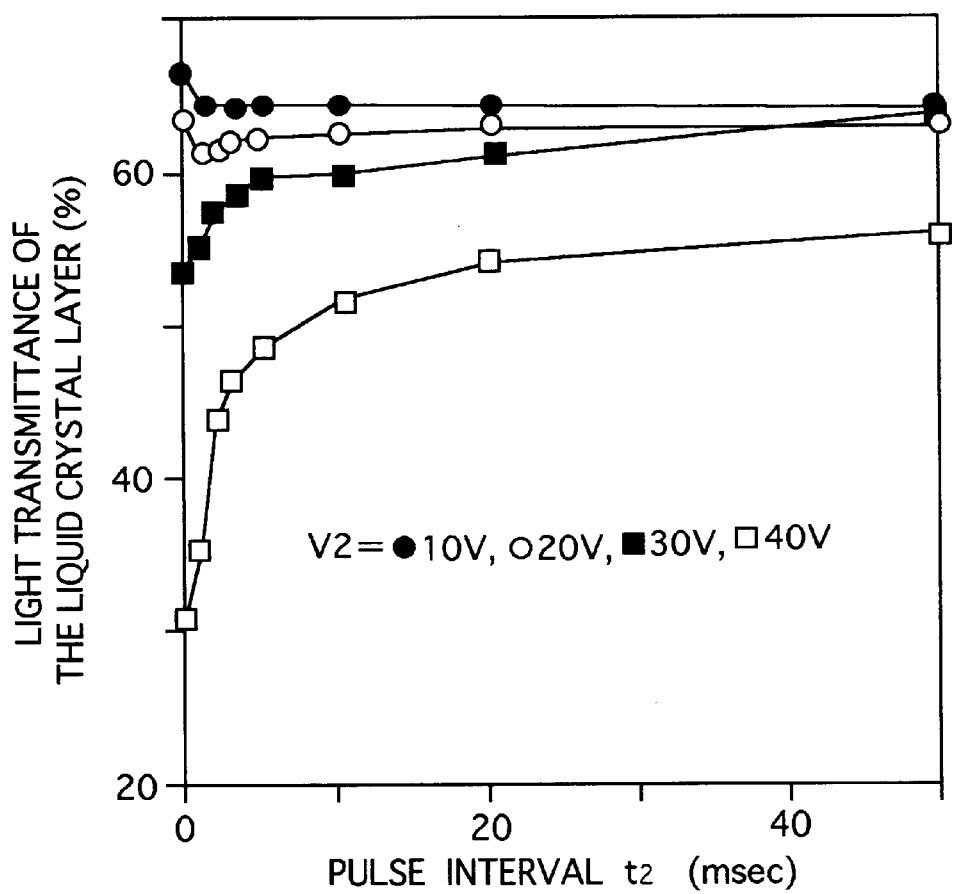
FIG. 3(B) shows a relationship between a pulse interval and a light transmittance of the liquid crystal layer in the display apparatus shown in FIG. 1 in the case where a voltage of the pattern shown in FIG. 3(A) is applied to the liquid crystal layer.

In the polymer network liquid crystal layer 3 of the first type, the voltage pulse of 130 V and 10 msec is applied for selecting the transmissive state, and, after a time interval of $t_2$, an additional voltage pulse of a voltage $V_2$ and 10 msec is applied one time (see FIG. 3(A)), in which case a visible light transmittance is determined as shown in FIG. 3(B). The additional voltage pulse $V_2$ is selectively set to 10 V, 20 V, 30 V and 40 V, in which cases the pulse interval $t_2$ is varied in a range from 0 msec to 50 msec, respectively.

As can be seen from FIG. 3(B), when the additional voltage pulse of a low voltage (e.g., of 10 V or 20 V) is applied, the transmissive state is substantially maintained regardless of the length of the pulse interval $t_2$. When the additional voltage pulse increases above the foregoing value, the transmissive state is not maintained and the intermediate state is set in some cases, depending on the pulse interval. For example, when the additional voltage pulse is 30 V, the transmissive state is maintained if the pulse interval $t_2$ is 20 msec or more, but the intermediate transmittance state, i.e., the state of an intermediate transmittance is stably maintained if the pulse interval is lower than 20 msec. If the additional voltage pulse is 40 V, states other than that of an intermediate transmittance cannot be achieved even if the pulse interval is 50 msec. If the additional voltage pulse is 30 V or more, an intermediate transmittance could be arbitrarily selected from a predetermined range of transmittance by controlling the pulse interval $t_2$ within a range of 5 msec or less, whereby display with multiple gradation is allowed. In this example, the additional voltage pulse of 30 V is desired from the viewpoint of the facts that the transmissive state can be achieved, and that the intermediate transmittance state can be arbitrarily achieved.

Figure 4A:
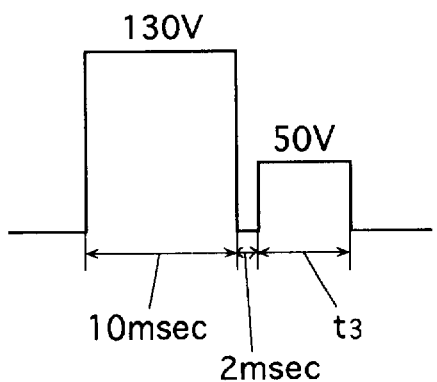
FIG. 4(A) shows still another example of a pattern of applying a voltage to the liquid crystal layer in the display apparatus shown in FIG. 1.
Figure 4B:
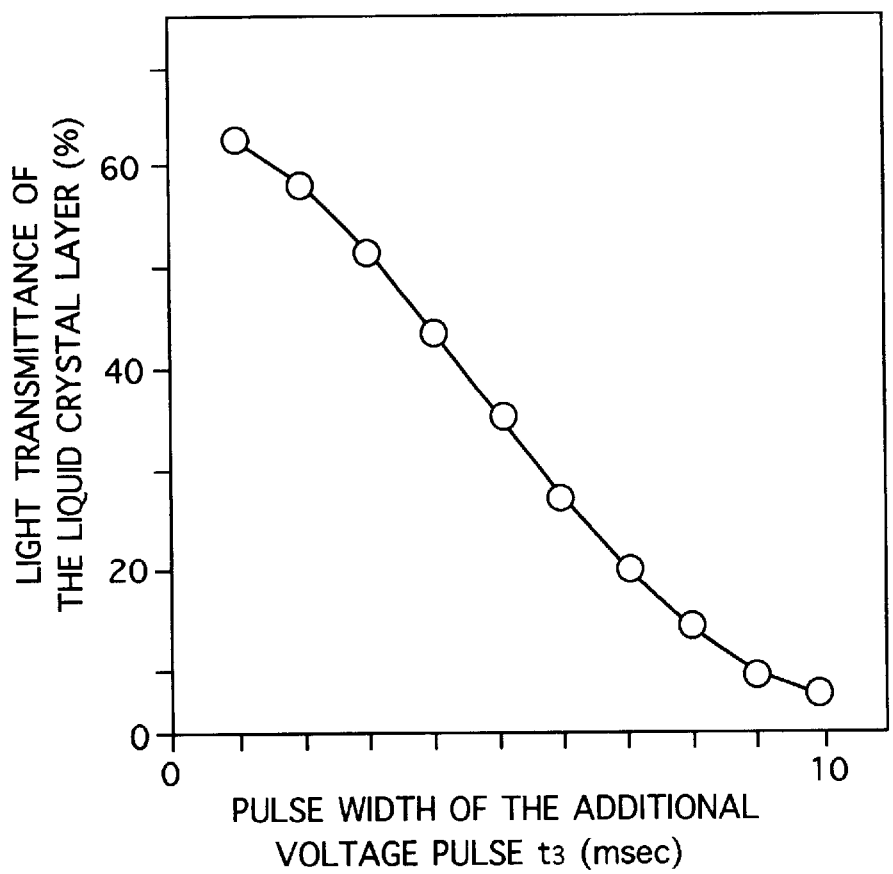
FIG. 4(B) shows a relationship between a pulse width of an additional voltage pulse (second voltage pulse) and a light transmittance of the liquid crystal layer in the case where a voltage of the pattern shown in FIG. 4(A) is applied to the liquid crystal layer in the display apparatus shown in FIG. 1.

In the polymer network liquid crystal layer 3 of the first type, the voltage pulse of 130 V and 10 msec is applied for selecting the transmissive state, and, after a pulse interval of 2 msec, an additional voltage pulse of 50 V and time $t_3$ is applied (see FIG. 4(A)), in which case a visible light transmittance is determined as shown in FIG. 4(B). In this case, the pulse interval $t_3$ is varied in a range from 1 msec to 10 msec.

As can be seen from FIG. 4(B), as the pulse width t3 of the additional voltage pulse increases, the transmittance lowers. Accordingly, a plurality of states of different intermediate transmittance values can be selected by controlling the pulse width of the additional voltage pulse, so that display with multiple gradation is allowed.

Figure 5A:
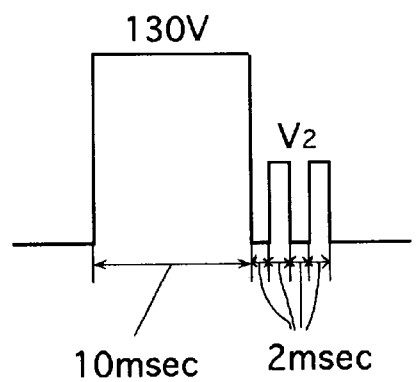
FIG. 5(A) shows still another example of a pattern of applying a voltage to the liquid crystal layer in the display apparatus shown in FIG. 1.
Figure 5B:
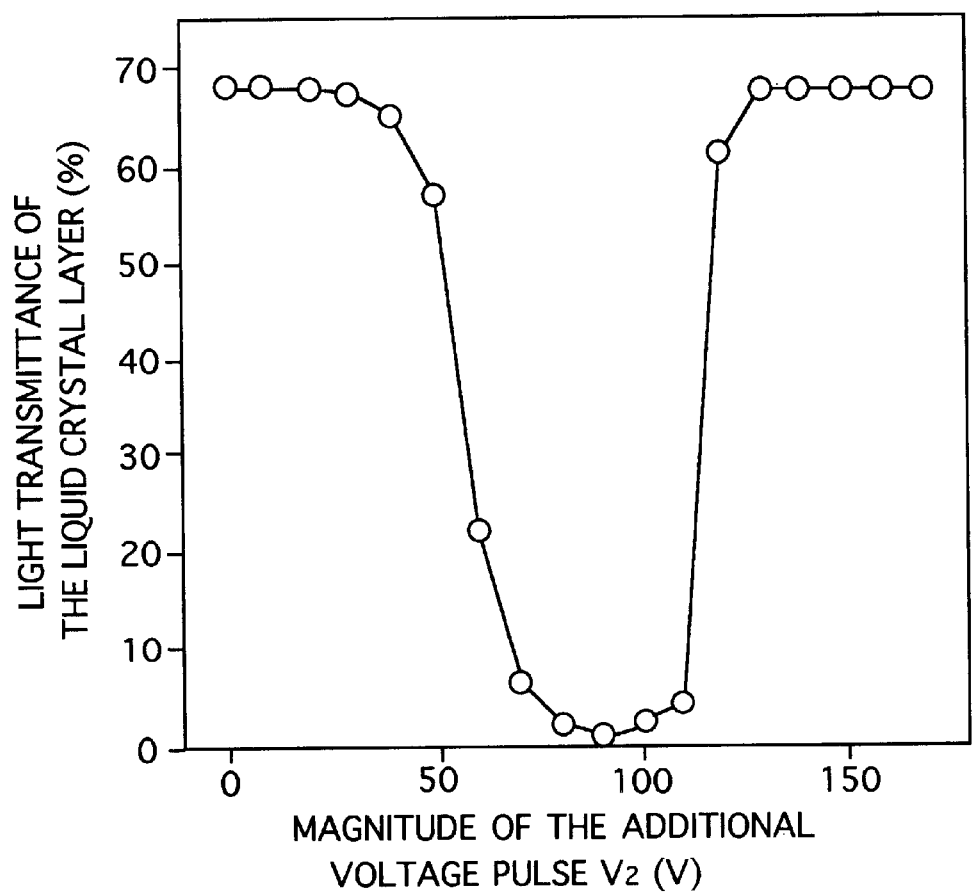
FIG. 5(B) shows a relationship between a magnitude of an additional voltage pulse (second voltage pulse) and a light transmittance of the liquid crystal layer in the case where a voltage of the pattern shown in FIG. 5(A) is applied to the liquid crystal layer in the display apparatus shown in FIG. 1.

In the polymer network liquid crystal layer 3 of the first type, the voltage pulse of 130 V and 10 msec is applied for selecting the transmissive state, and, after a pulse interval of 2 msec, an additional voltage pulse of voltage $V_2$ and 2 msec is applied two times (see FIG. 5(A)), in which case a visible light transmittance is determined as shown in FIG. 5(B).

As can be seen from FIG. 5(B), the transmittance can be arbitrarily changed and the state of the changed transmittance can be stably maintained by controlling the magnitude of the voltage pulse even in such a case that a plurality of additional voltage pulses are applied during a period before the polymer network liquid crystal layer 3 is stabilized in the transmissive state.

Description will now be given on the study of change in the transmittance in such a case that, in the display apparatus shown in FIG. 1, the liquid crystal layer 3 is formed of the polymer network liquid crystal layer of the second type different from the polymer network liquid crystal layer of the first type described above. The polymer network liquid crystal layer of this second type contains the chiral nematic liquid crystal and the photo-curable resin, which are the same as those used in the polymer network liquid crystal layer of the first type, but the weight ratio thereof is 85:15 and therefore different from that of the first type. Conditions other than the above are the same as those of the polymer network liquid crystal layer of the first type.

Figure 6A:
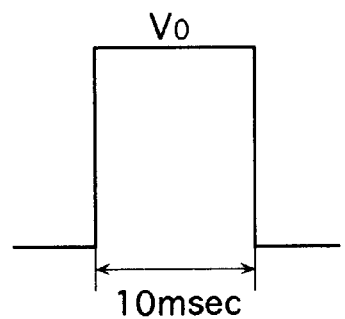
FIG. 6(A) shows an example of a pattern of applying a voltage to a different liquid crystal layer in the display apparatus shown in FIG. 1.
Figure 6B:
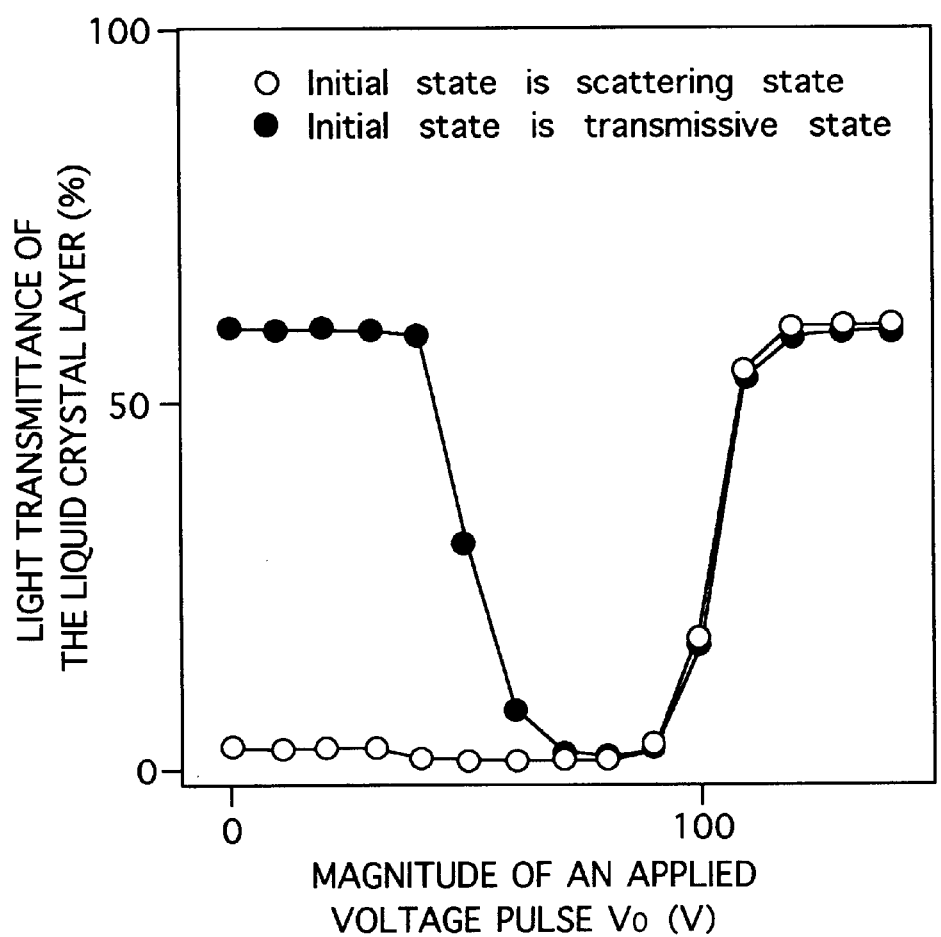
FIG. 6(B) shows a relationship between a magnitude of an applied voltage pulse and a light transmittance of this liquid crystal layer in the cases where a voltage of the pattern shown in FIG. 6(A) is applied to the liquid crystal layer in each state of a transmissive state and a scattering state.

The voltage pulse $V_0$ of 10 msec in width is applied to the polymer network liquid crystal layer (see FIG. 6(A)) initially set to the transmissive state or the scattering state, in which case a visible light transmittance of the liquid crystal layer is shown in FIG. 6(B). In FIG. 6(B), blank circular marks represent the light transmittance in the case where the initial state is the scattering state, and solid circular marks represent the light transmittance in the case where the initial state is the transmissive state.

As can be seen from FIG. 6(B), the polymer network liquid crystal layer of the second type attained the transmissive state regardless of the initial state, when the voltage pulse of 120 V or more is applied. Regardless of its initial state, it attained the scattering state when a voltage pulse between 70 V and 90 V is applied. Each state does not change when the voltage pulse of 40 V or less is applied. Therefore, the following can be understood. In the polymer network liquid crystal layer in either of the first and second types, the magnitude of the voltage pulse $V_0$ is controlled to select arbitrarily the transmissive state and the scattering state regardless of the initial state.

Figure 7A:
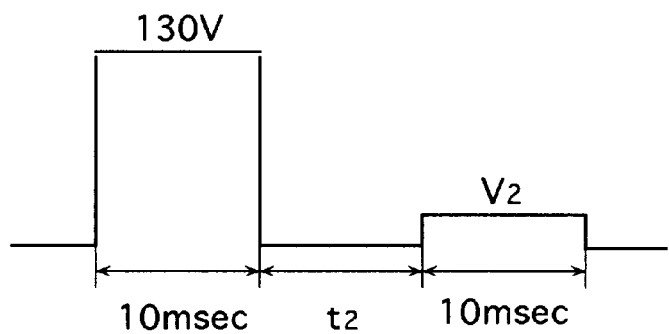
FIG. 7(A) shows another example of a pattern of applying a voltage to the liquid crystal layer in the display apparatus used in the experiment of which results are shown in FIG. 6(B)
Figure 7B:
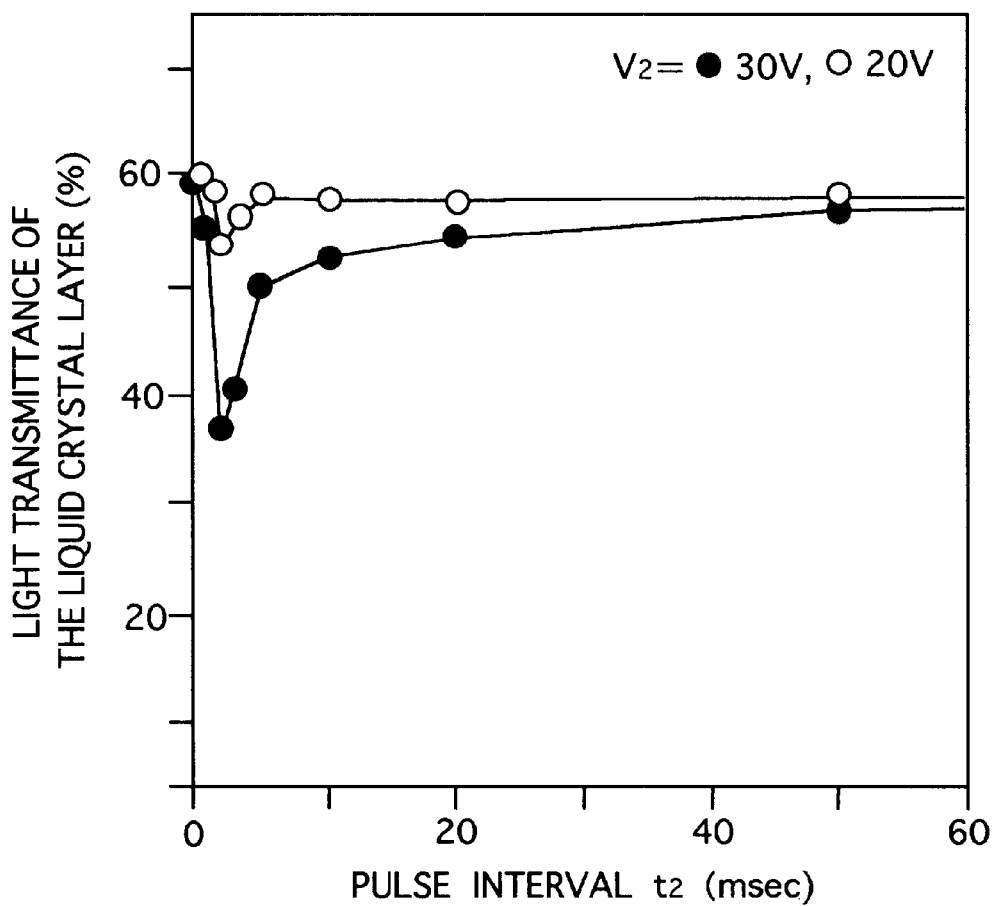
FIG. 7(B) shows a relationship between a pulse interval and a light transmittance of the liquid crystal layer in the case where a voltage of the pattern shown in FIG. 7(A) is applied to the liquid crystal layer in this display apparatus.

In the polymer network liquid crystal layer of the second type, the voltage pulse of 130 V and 10 msec is applied for selecting the transmissive state, and, after a pulse interval of $t_2$, an additional voltage pulse of a $V_2$ and 10 msec is applied similarly to the case shown in FIG. 3(B) (see FIG. 7(A)), in which case a visible light transmittance is determined as shown in FIG. 7(B). In this case, the additional voltage pulse $V_2$ is selectively set to 20 V and 30 V, and the pulse interval $t_2$ is varied in a range from 0 msec to 50 msec.

As can be seen from FIG. 7(B), the transmissive state is substantially maintained even after application of the additional pulse if the pulse interval $t_2$ is very short and not larger than 1 msec, or is 5 msec or more, in both cases that the additional voltage pulse $V_2$ is 20 V and that it is 30 V. Conversely, if the pulse interval is around 2 msec, the transmittance goes to the minimum value, and the transmittance significantly changes with the pulse interval slightly larger or smaller than the minimum value, so that the state of the intermediate transmittance can be selected. In this example, the additional voltage pulse is desirably 30 V from the viewpoint that the transmissive state can be attained and that the state of an intermediate transmittance can be arbitrarily selected from a relatively wide transmittance range.

Then, a display apparatus allowing a-line-at-a-time matrix driving will be described below. FIG. 8 is a block diagram showing a whole structure of an electric circuit of this display apparatus. FIG. 9 is an exploded view showing a specific structure of a liquid crystal display A' of the display apparatus.

This display apparatus is formed of a liquid crystal display A' and a drive circuit B' for driving the same. The liquid crystal display A' is similar to the liquid crystal display A of the display apparatus shown in FIG. 1 except for that a large number of parallel and horizontal scanning line paths 41, 42, ..., 4n are arranged on the inner side of one of the glass plates 1, and a large number of segment line paths 51, 52, ..., 5n perpendicular to the scanning line paths 41, 42, ..., 4n are arranged on the inner side of the other glass plate 1. The polymer network liquid crystal layer 3 is the same as that of the first type already described. Structures other than the above are the same as those of the apparatus shown in FIG. 1, and the same parts and portions bear the same reference numbers.

The drive circuit B' includes a scanning line path drive circuit 64 for successively applying a voltage to the scanning line paths 41, 42, ..., 4n, a segment line path drive circuit 65 for successively applying a voltage to the segment line paths 51, 52, ..., 5n, a waveform generating circuit 62 for controlling the drive circuits 64 and 65 based on the data stored in a memory 61 which will be described below, the memory 61 which stores data (data of an applied voltage pulse to be described later) for controlling and setting the liquid crystal display A' to a transmissive state, a scattering state or an arbitrary transmittance state and supplies this data to the waveform generating circuit 62, and a clock generator 63 for supplying a timing signal to the waveform generating circuit 62, scanning line path drive circuit 64 and segment line path drive circuit 65.

For a-line-at-a-time driving of this liquid crystal display A', the selected scanning line path is supplied with a voltage different from those for unselected scanning line paths, and different line paths are successively selected with a predetermined time interval. Each segment line is supplied with a voltage corresponding to an intended display state of the picture element at the crossing of the segment line path and the selected scanning line path.

Figure 10:
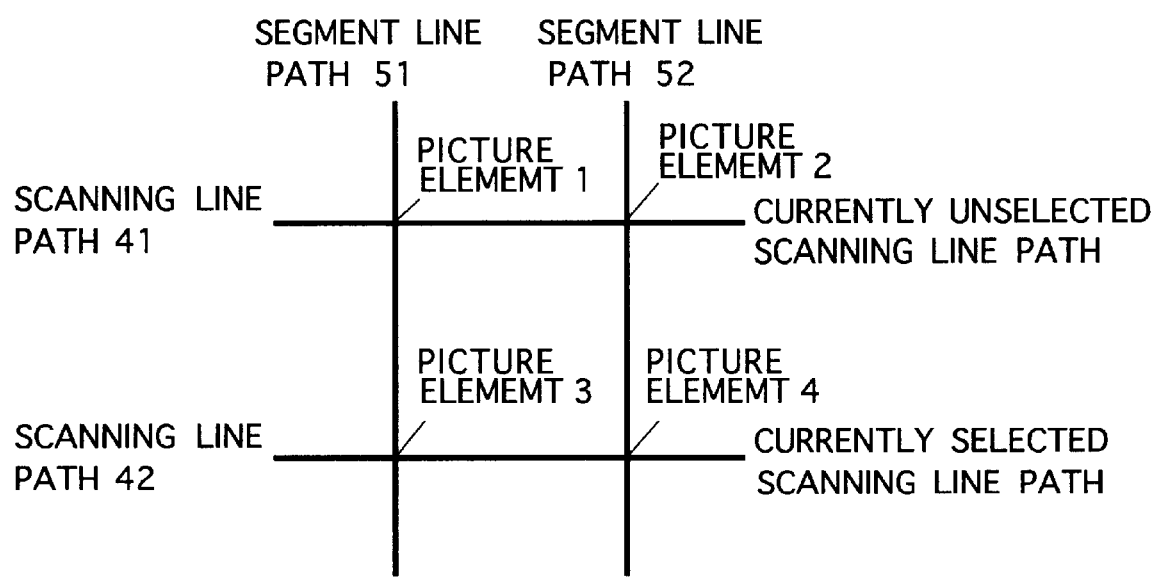
FIG. 10 shows briefly a matrix in the display apparatus shown in FIG. 8.

For simplicity reason, in the following description, the liquid crystal display A' shown in FIG. 9 having the two scanning line paths 41 and 42 as well as the two segment line paths 51 and 52 will be used. FIG. 10 shows a matrix formed of these two scanning line paths and two segment line paths. In the figure, it is assumed that the scanning line path 42 is currently selected, and the scanning line path 41 is currently unselected. It is also assumed that picture elements 1, 2, 3 and 4 are formed at crossings of the scanning line path 41 and the segment line path 51, the scanning line path 41 and the segment line path 52, the scanning line path 42 and the segment line path 51, and the scanning line path 42 and the segment line path 52, respectively.

The liquid crystal display having this 2×2-matrix is operated as follows. Since the scanning line path 42 is currently selected, the first voltage pulse is applied to the picture elements 3 and 4 on the scanning line path 42. This first voltage pulse has a magnitude and a width, which set liquid crystal molecules to a homeotropic orientation parallel to an electric field. With a predetermined pulse interval after the first voltage pulse, a second voltage pulse is applied.

The optical state of each picture element is determined by controlling the magnitudes, pulse widths and pulse intervals of the first and second voltage pulses, if the material and mixture ratio of the layers are constant. The second voltage pulse may be formed of a plurality of voltage pulses (which may be a plurality of voltage pulses having different magnitudes and/or widths).

Description will now be given on specific examples of driving the liquid crystal display having the matrix shown in FIG. 10.

EXAMPLE 1

As shown in FIG. 5(B), the first voltage pulse of 130 V and 10 msec is applied to the liquid crystal display A provided with the polymer network liquid crystal layer 3 of the first type, and, after 2 msec, a voltage pulse of 130 V and 2 msec is applied two times, as the second voltage pulse, with an interval of 2 msec. In this case, the liquid crystal layer stably attained the transmissive state regardless of the initial state (i.e., scattering state or transmissive state). Also, the first voltage pulse of 130 V and 10 msec is applied to the same element, and, after 2 msec, the voltage pulse of 110 V and 2 msec is applied two times, as the second voltage pulse, with an interval of 2 msec. In this case, the liquid crystal layer stably attained the scattering state regardless of the initial state (i.e., scattering state or transmissive state).

Figure 11A:
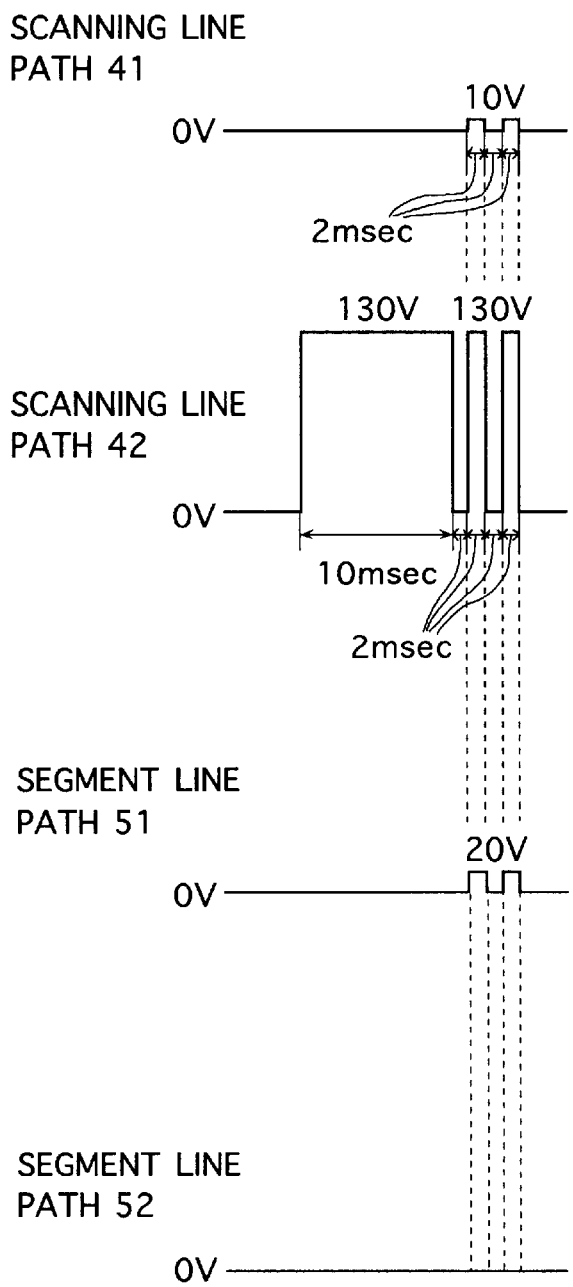
FIG. 11(A) shows an example of a pattern of applying voltages to scanning line paths and segment line paths in the matrix shown in FIG. 10.
Figure 11B:
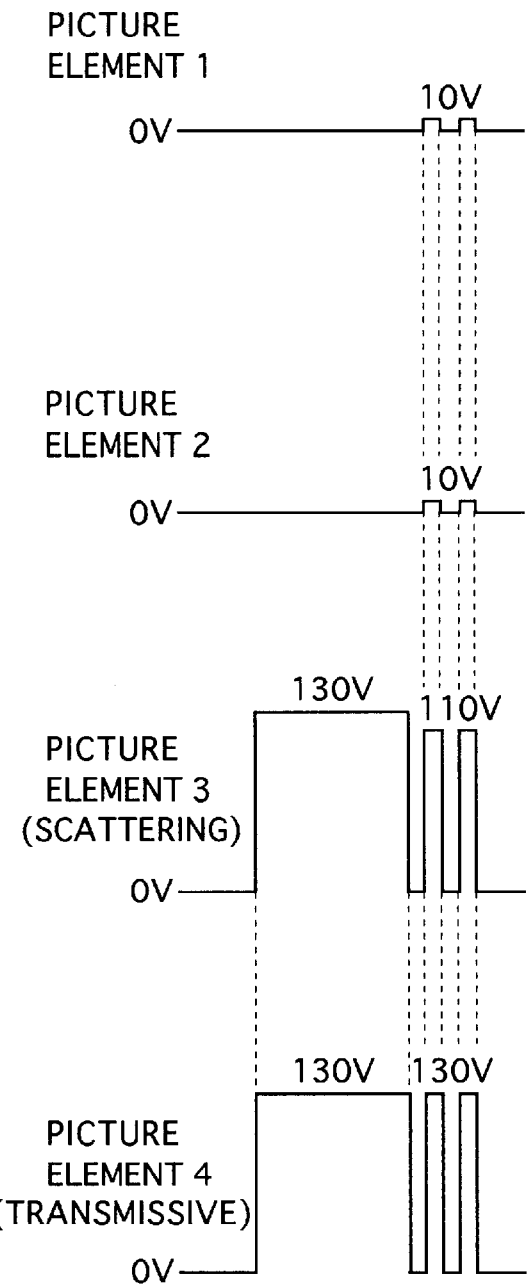
FIG. 11(B) shows a pattern of applying voltages to respective picture elements determined by the pattern shown in FIG. 11(A)

Under the voltage application conditions which are found as described above, the liquid crystal display having the matrix shown in FIG. 10 is driven. The patterns of voltage application to respective scanning line paths and segment line paths are shown in FIG. 11(A), and the patterns of voltage application to the respective picture elements determined as a result of the above pattern are shown in FIG. 11(B). Thus, the selected scanning line path 42 is supplied with the first voltage pulse of 130 V and 10 msec, and, after 2 msec, is supplied with the second voltage pulse formed of a voltage pulse of 130 V and 2 msec and a voltage pulse of 130 V and 2 msec delayed by 2 msec. Meanwhile, the unselected line path 41 is supplied with the pulse voltage formed of a voltage pulse of 10 V and 2 msec and a similar pulse delayed by 2 msec, in synchronization with application of the respective voltage pulses forming the second voltage pulse applied to the selected scanning line path 42. The segment line path 51 is supplied with the voltage pulse, which is formed of a voltage pulse of 20 V and 2 msec and a similar pulse delayed by 2 msec, in synchronization with application of the respective voltage pulses forming the second voltage pulse applied to the selected scanning line path 42. A voltage is not applied to the segment line path 52.

As a result, the picture element 3 on the selected scanning line path is supplied with the voltage pulse of 130 V and 10 msec, and, after 2 msec, is supplied with the voltage pulse of 110 V and 2 msec two times with an interval of 2 msec. Therefore, the picture element 3 is stabilized in the scattering state. Meanwhile, the picture element 4 is supplied with the voltage pulse of 130 V and 2 msec, and, after 2 msec, is supplied with the voltage pulse of 130 V and 2 msec two times with an interval of 2 msec. Therefore, the picture element 4 is stabilized in the transmissive state. The picture elements 1 and 2 on the unselected scanning line path is supplied only with the voltage pulse of 10 V and 2 msec two times with an interval of 2 msec, so that the states of transmittance of these picture elements do not change.

EXAMPLE 2

In the liquid crystal display A provided with the polymer network liquid crystal layer 3 of the first type, a voltage pulse of 130 V and 5 msec and a voltage pulse of −130 V and 5 msec are successively applied as the first voltage pulse, and, after 2 msec, a voltage pulse of 130 V and 2 msec and a voltage pulse of −130 V and 2 msec delayed by 2 msec are applied as the second voltage pulse. Thereby, the transmissive state is attained in both the cases that the initial state is the scattering state and that it is the transmissive state. A voltage pulse of 130 V and 5 msec and a voltage pulse of −130 V and 5 msec are successively applied as the first voltage pulse to the polymer network liquid crystal layer 3, and, after 2 msec, a voltage pulse of 110 V and 2 msec and a voltage pulse of −110 V and 2 msec delayed by 2 msec are applied as the second voltage pulse. Thereby, the liquid crystal layer attained the scattering state in both the cases that the initial state is the scattering state and that it is the transmissive state.

Figure 12A:
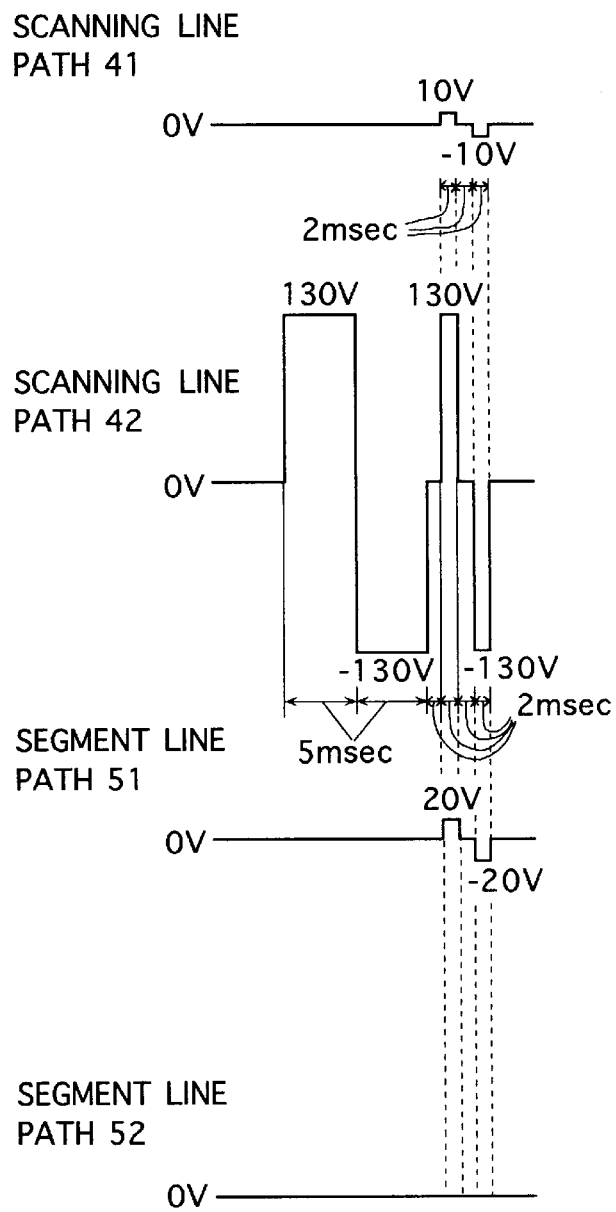
FIG. 12(A) shows another example of a pattern of applying voltages to scanning line paths and segment line paths in the matrix shown in FIG. 10.
Figure 12B:
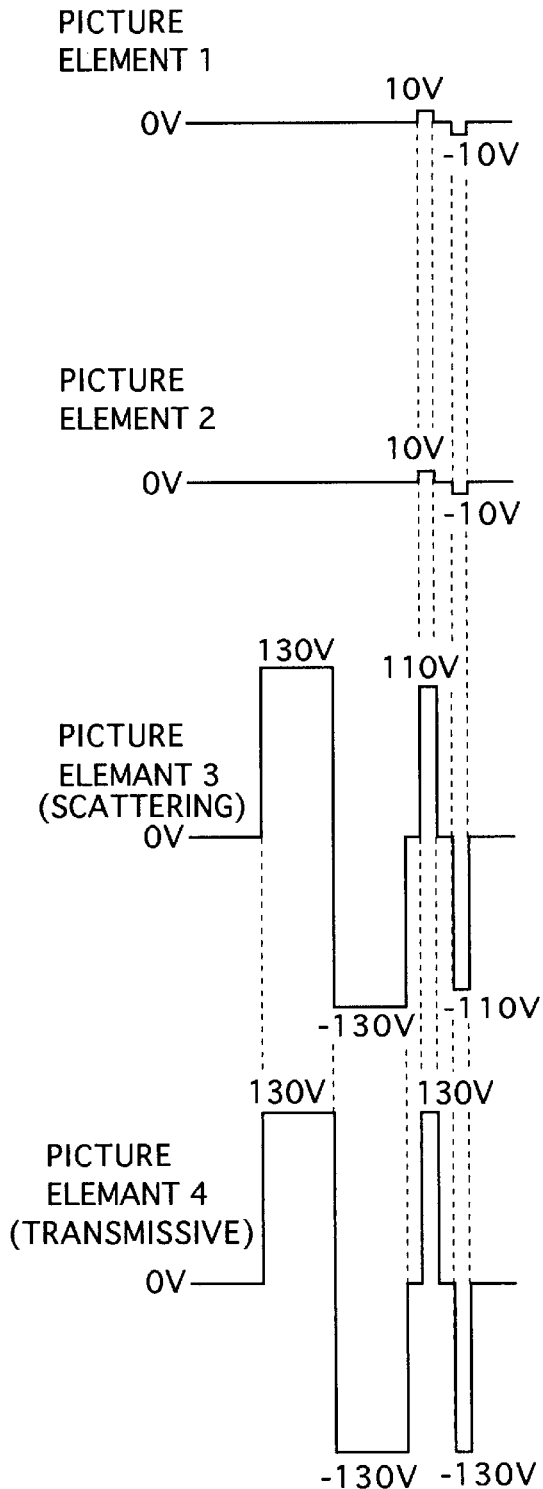
FIG. 12(B) shows a pattern of applying voltages to respective picture elements determined by the pattern shown in FIG. 12(A)

Under the voltage application conditions which are found as described above, the matrix shown in FIG. 10 is driven. The patterns of voltage application to respective scanning line paths and segment line paths are shown in FIG. 12(A), and the patterns of voltage application to the respective picture elements determined as a result of the above pattern are shown in FIG. 12(B). Thus, the selected scanning line path 42 is supplied with the first voltage pulse formed of the voltage pulse of 130 V and 5 msec and the voltage pulse of −130 V and 5 msec, and, after 2 msec, is supplied with the second voltage pulse formed of a voltage pulse of 130 V and 2 msec and a voltage pulse of −130 V and 2 msec delayed by 2 msec. The unselected scanning line path 41 is supplied with a voltage pulse of 10 V and 2 msec and a pulse of −10 V and 2 msec delayed by 2 msec in synchronization with application of the respective voltage pulses forming the second voltage pulse applied to the selected scanning line path 42. The segment line path 51 is supplied with a voltage pulse of 20 V and 2 msec and a pulse of −20 V and 2 msec delayed by 2 msec in synchronization with application of the respective voltage pulses forming the second voltage pulse applied to the selected scanning line path 42. A voltage is not applied to the segment line path 52.

As a result, the picture element 3 on the selected scanning line path is supplied with the first voltage pulse formed of the voltage pulse of 130 V and 5 msec and the voltage pulse of −130 V and 5 msec, and, after 2 msec, is supplied with the second voltage pulse formed of the voltage pulse of 110 V and 2 msec and the voltage pulse of −110 V and 2 msec delayed by 2 msec. Therefore, the picture element 3 is stabilized in the scattering state. Meanwhile, the picture element 4 is supplied with the first voltage pulse formed of the voltage pulse of 130 V and 5 msec and the voltage pulse of −130 V and 5 msec, and, after 2 msec, is supplied with the second voltage pulse formed of the voltage pulse of 130 V and 2 msec and the voltage pulse of −130 V and 2 msec delayed by 2 msec. Therefore, the picture element 4 is stabilized in the transmissive state. The picture elements 1 and 2 on the unselected scanning line path are supplied only with the voltage pulses of 10 V and 2 msec and the voltage pulse of −10 V and 2 msec delayed by 2 msec, so that the states of transmittance of these picture elements do not change.

EXAMPLE 3

In the liquid crystal display A provided with the polymer network liquid crystal layer 3 shown in FIG. 1, the first voltage pulse of 130 V and 10 msec is applied, and, after 2 msec, a voltage pulse of 130 V and 2 msec and a voltage pulse of 110 V and 2 msec delayed by 2 msec are applied as the second voltage pulse. Thereby, an intermediate state 1 with the transmittance of 13% is stably attained regardless of the initial state. A first voltage pulse of 130 V and 10 msec is applied as the first voltage pulse to the polymer network liquid crystal layer 3, and, after 2 msec, a voltage pulse of 110 V and 2 msec and a voltage pulse of 130 V and 2 msec delayed by 2 msec are applied thereto as the second voltage pulse. Thereby, an intermediate state 2 with the transmittance of 32% is stably attained regardless of the initial state.

Figure 13A:
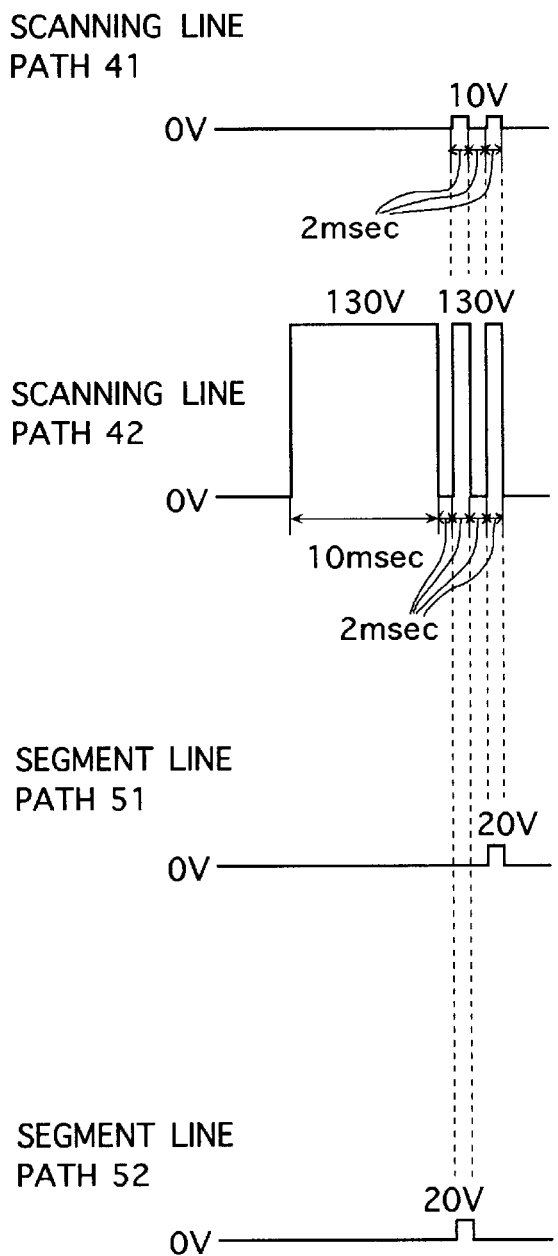
FIG. 13(A) shows still another example of a pattern of applying voltages to scanning line paths and segment line paths in the matrix shown in FIG. 10.
Figure 13B:
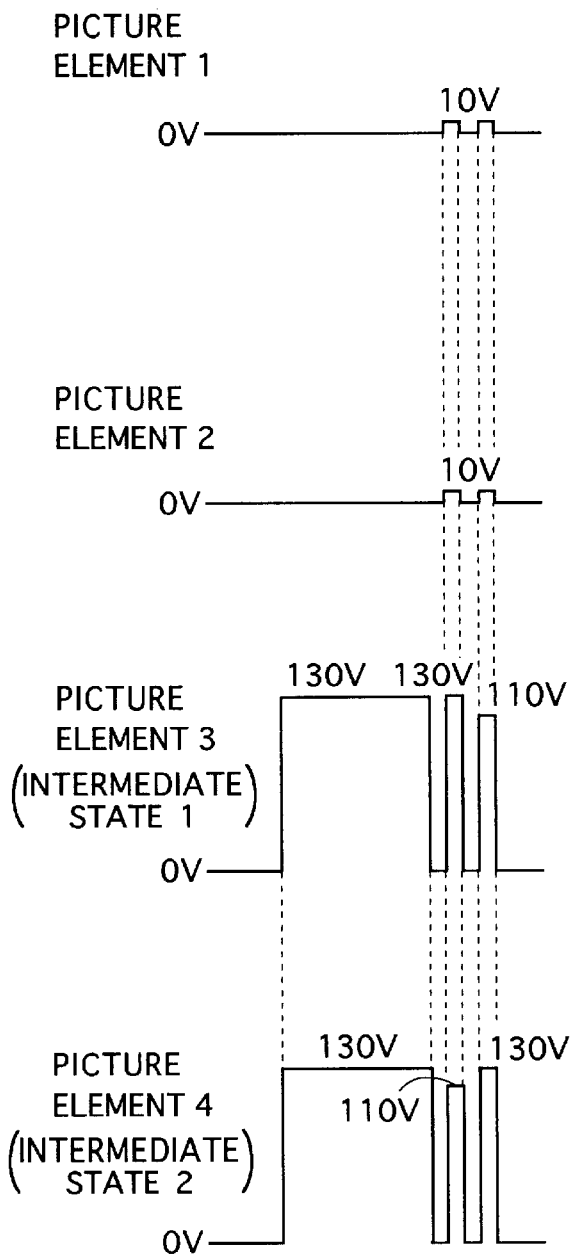
FIG. 13(B) shows a pattern of applying voltages to respective picture elements determined by the pattern shown in FIG. 13(A)

Under the voltage application conditions which are found as described above, the matrix shown in FIG. 10 is driven. The patterns of voltage application to the respective scanning line paths and segment line paths are shown in FIG. 13(A), and the patterns of voltage application to the respective picture elements determined as a result of the above pattern are shown in FIG. 13(B). Thus, the selected scanning line path 42 is supplied with the first voltage pulse of 130 V and 10 msec, and, after 2 msec, is supplied with the second voltage pulse formed of a voltage pulse of 130 V and 2 msec and a voltage pulse of 130 V and 2 msec delayed by 2 msec. The unselected scanning line path 41 is supplied with a voltage pulse of 10 V and 2 msec and a pulse of 10 V and 2 msec delayed by 2 msec in synchronization with application of the respective voltage pulses forming the second voltage pulse applied to the selected scanning line path 42. The segment line path 51 is supplied one time with a voltage pulse of 20 V and 2 msec in synchronization with application of later one of the voltage pulses forming the second voltage pulse applied to the selected scanning line path 42. The segment line path 52 is supplied one time with a voltage pulse of 20 V and 2 msec in synchronization with application of earlier one of the voltage pulses forming the second voltage pulse applied to the selected scanning line path 42.

As a result, the picture element 3 on the selected scanning line path is supplied with the first voltage pulse of 130 V and 10 msec, and, after 2 msec, is supplied with the second voltage pulse formed of the voltage pulse of 130 V and 2 msec and the voltage pulse of 110 V and 2 msec delayed by 2 msec. Therefore, the picture element 3 is stabilized in the intermediate state 1 with the transmittance of 13%. Meanwhile, the picture element 4 is supplied with the first voltage pulse of 130 V and 10 msec, and, after 2 msec, is supplied with the second voltage pulse formed of the voltage pulse of 110 V and 2 msec and the voltage pulse of 130 V and 2 msec delayed by 2 msec. Therefore, the picture element 4 is stabilized in the intermediate state 2 with the transmittance of 32%. The picture elements 1 and 2 on the unselected scanning line path are supplied two times only with the voltage pulse of 10 V and 2 msec with an interval of 2 msec, so that the states of transmittance of these picture elements do not change.

EXAMPLE 4

Figure 14:
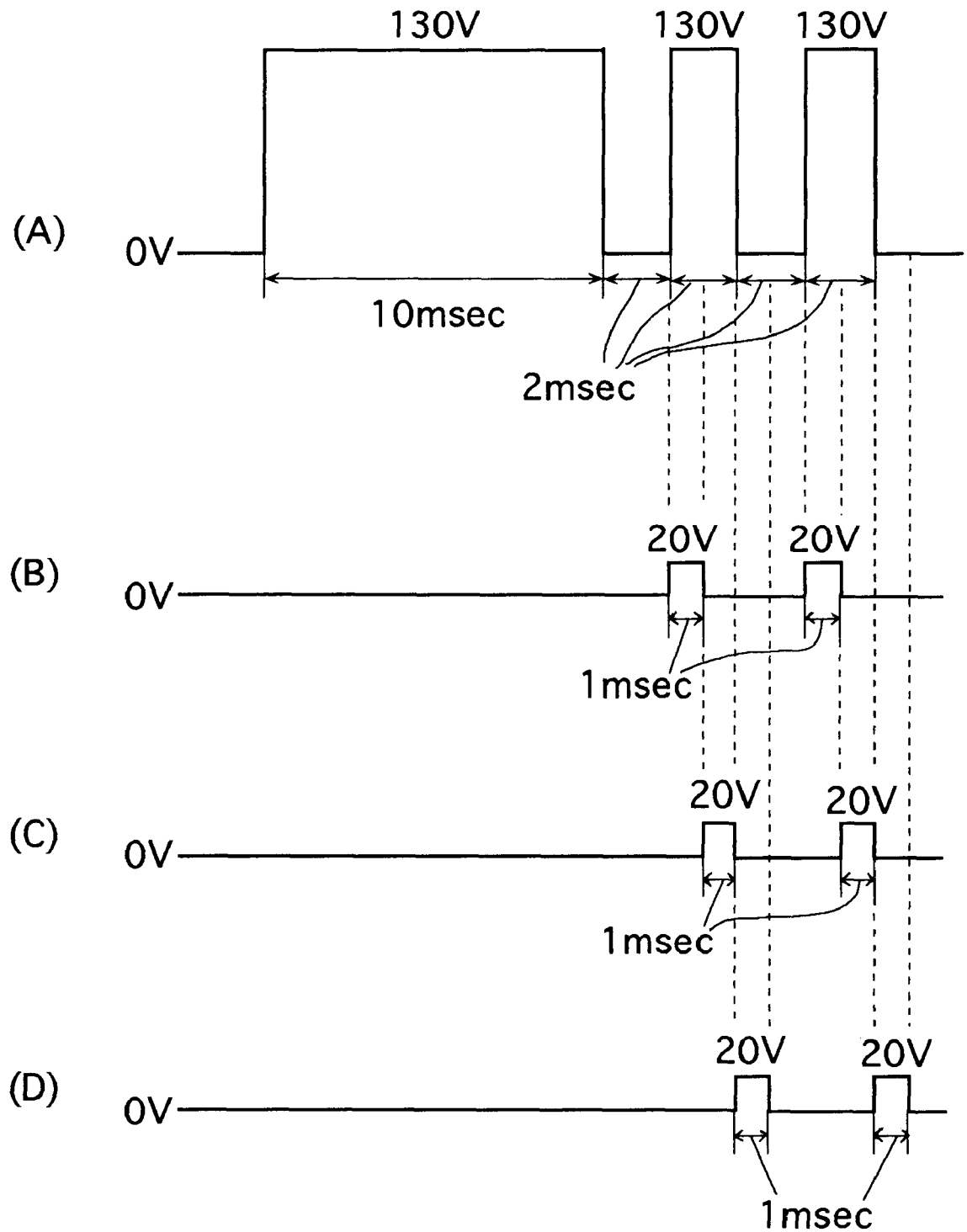
FIG. 14 shows patterns of applying a voltage to a selected scanning line path 42 and a segment line path 51 in the matrix shown in FIG. 10, and particularly shows a pattern (A) as an example of a pattern of applying a voltage to the selected scanning line path 42 as well as patterns (B), (C) and (D) as examples of patterns of applying a voltage to the segment line path 51.

In the matrix shown in FIG. 10, the first voltage pulse of 130 V and 10 msec is applied to the selected scanning line path 42, and, after 2 msec, a voltage pulse of 130 V and 2 msec and a voltage pulse of 130 V and 2 msec delayed by 2 msec are applied thereto as the second voltage pulse (see a pattern (A) in FIG. 14). The segment line path 51 is supplied with a voltage pulse of 20 V and 1 msec during 1 msec of an earlier or later half of each of the two voltage pulses forming the second voltage pulse, which is applied to the selected scanning line path 42, or during an earlier half of the interval of 2 msec between these two voltage pulses (see patterns (B), (C) and (D) in FIG. 14).

Figure 15:
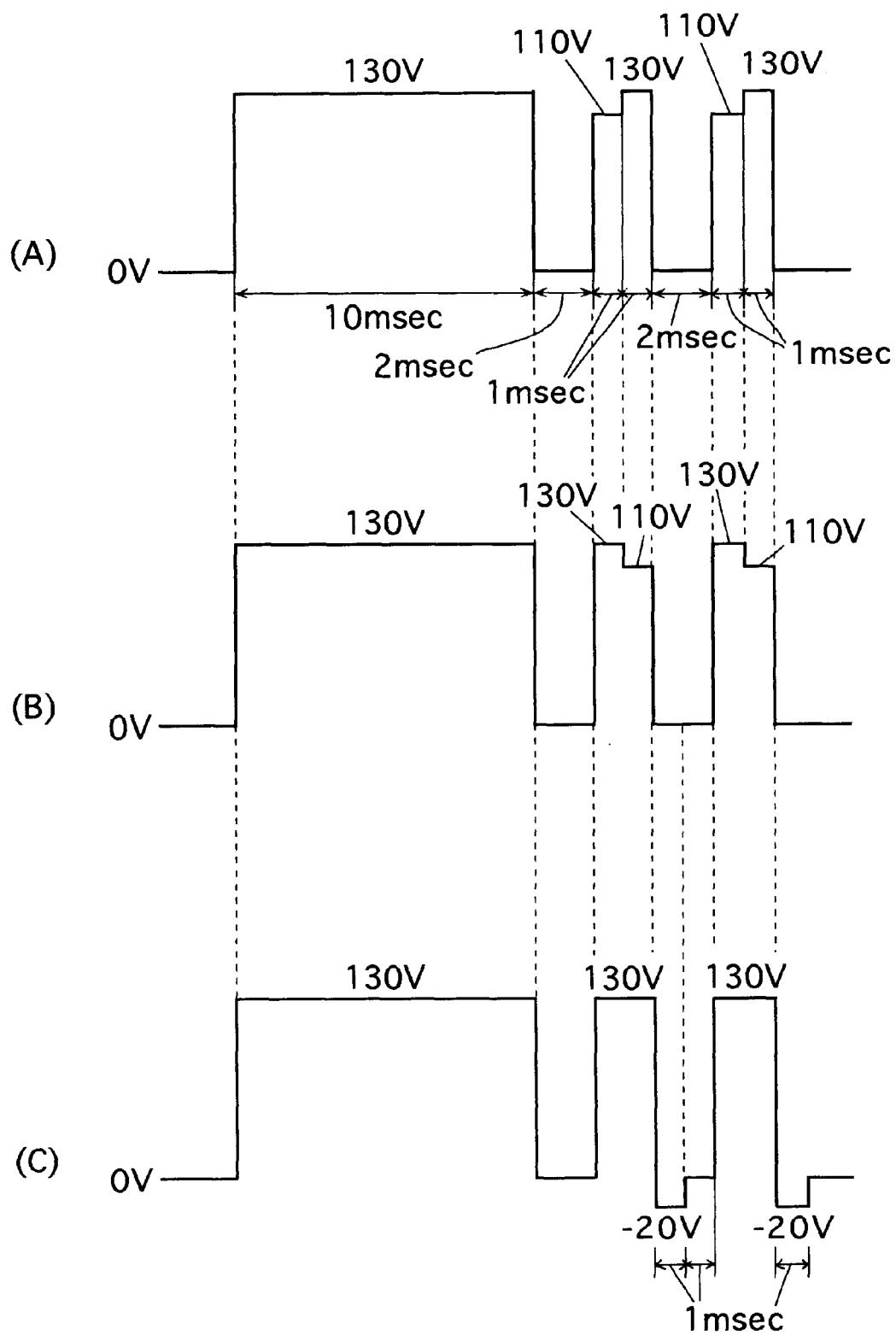
FIG. 15 shows patterns of applying a voltage to a picture element 3 in the case where a voltage is applied to the segment line path 51 in the matrix shown in FIG. 10 in accordance with the patterns shown in FIG. 14, and particularly shows patterns (A), (B) and (C) of voltage application to the picture element 3 in the case where voltage application to the segment line path 51 is performed in accordance with the patterns (B), (C) and (D) in FIG. 14, respectively.

As a result, the picture element 3 on the selected scanning line path is supplied with the first voltage pulse of 130 V and 10 msec, and, after 2 msec, is supplied with the second voltage pulse formed of the voltage pulse of 110 V and 1 msec and the voltage pulse of 130 V and 1 msec as well as the similar voltage pulses delayed by 2 msec, as can be seen from the pattern (A) in FIG. 15. Alternatively, it is supplied with the first voltage pulse of 130 V and 10 msec, and, after 2 msec, is supplied with the second voltage pulse formed of the voltage pulse of 130 V and 1 msec and the voltage pulse of 110 V and 1 msec as well as the similar voltage pulses delayed by 2 msec, as can be seen from the pattern (B) in FIG. 15. Further alternatively, it is supplied with the first voltage pulse of 130 V and 10 msec, and, after 2 msec, is supplied with the second voltage pulse formed of the voltage pulse of 130 V and 2 msec and the voltage pulse of −20 V and 1 msec as well as the similar voltage pulses delayed by 2 msec, as can be seen from the pattern (C) in FIG. 15. With the voltage application patterns (A), (B) and (C) in FIG. 15, the liquid crystal layer exhibits the intermediate transmittance of different values.

As described above, by slightly shifting the timing of voltage application to the segment line paths, the transmittance of various values can be attained, and therefore the transmittance of an intended value can be attained.

According to the examples 1 and 2, as described above, the picture elements 3 and 4 on the selected scanning line path 42 can be set to the scattering state and the transmissive state, respectively, within a shorter time than the case where the transmissive state and the scattering state are set by applying the voltage pulse only one time for a long time. Therefore, rapid driving of the display apparatus is allowed.

According to the examples 1 and 2, the picture element on the selected scanning line path can be selectively set to the two states, i.e., transmissive and scattering states by slightly changing the magnitude of the additional voltage pulse (second voltage pulse), so that it is possible to reduce a difference in magnitude between the voltage pulse to be applied to the segment line path selecting the transmission and the voltage pulse to be applied to the segment line path selecting the scattering. Therefore, a scanning speed can be increased, so that rapid driving is allowed. Furthermore, the voltage applied to picture elements on unselected scanning line paths can be small.

As can be understood from the examples 3 and 4, by setting the magnitude and pulse width of the second voltage pulse to appropriate values, an intermediate state of an arbitrary transmittance can be selected, so that the display apparatus allowing multiple gradation can be formed.

The magnitudes, pulse widths, pulse intervals and others of the first and second voltage pulses may be specifically selected in accordance with the polymer network liquid crystal layer and a mixture ratio of the materials.

As can be understood from the example 2, the life-time of the liquid crystal display can be increased by continuously applying the positive and negative voltage pulses.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display apparatus comprising:
   a liquid crystal display having a pair of plates with electrodes and a liquid crystal layer retained between said plates, said liquid crystal layer including cholesteric liquid crystal exhibiting a cholesteric phase; and
   a driver connected to said liquid crystal display to apply voltage pulses to said electrodes, said driver applying a first voltage pulse and after a predetermined lapse of time further applying a second voltage pulse in according with desired gradation, the first voltage pulse resetting said cholesteric liquid crystal by temporally setting molecules thereof to a homeotropic arrangement, the second voltage pulse setting said cholesteric liquid crystal to a stable state corresponding to the desired gradation,
   wherein said cholesteric liquid crystal remains in said stable state after application of said second voltage pulse in absence of any further voltage application.

2. The display apparatus as claimed in claim 1, wherein said cholesteric liquid crystal is chiral nematic liquid crystal, and wherein said liquid crystal layer is formed of chiral nematic liquid crystal and resin added thereto.

3. The display apparatus as claimed in claim 1, wherein said second voltage pulse is formed of a plurality of voltage pulses.

4. The display apparatus as claimed in claim 1, further comprising a controller connected to said driver, said controller adjusting the predetermined lapse of time in accordance with a desired transmittance of said liquid crystal display.

5. The display apparatus as claimed in claim 1, further comprising a controller connected to said driver, said controller adjusting a level of said second voltage pulse in accordance with a desired transmittance of said liquid crystal display.

6. The display apparatus as claimed in claim 1, wherein said liquid crystal display is a passive matrix display having elongated scanning line paths supported on one of said plates and elongated segment line paths supported on the other of said plates as the electrodes, and said driver applies different voltage pulses to each of said scanning and segment line paths to drive said passive matrix display, and wherein said first and second voltage pulses are applied to a specified one among said scanning line paths.

7. The display apparatus as claimed in claim 6, further comprising a controller connected to said driver, said controller adjusting a level of voltage pulse to be applied to each of said scanning and segment line paths in accordance with gradation of an image to be displayed.

8. The display apparatus as claimed in claim 6, further comprising a controller connected to said driver, said controller adjusting a timing of application of the voltage pulse to said segment line paths in accordance with gradation of an image to be displayed.

9. The display apparatus as claimed in claim 1, wherein each of said first and second voltage pulses is formed of a positive voltage pulse and a negative voltage pulse.

10. A display apparatus comprising:
    a liquid crystal display having a pair of plates with electrodes and a liquid crystal layer retained between said plates, said liquid crystal layer including a cholesteric liquid crystal exhibiting a cholesteric phase;
    a driver connected to said liquid crystal display for applying a first voltage pulse and a second voltage pulse following said first voltage pulse,
    wherein the first voltage pulse resets said cholesteric liquid crystal by temporally setting molecules thereof to a homeotropic arrangement, and the second voltage pulse sets said cholesteric liquid crystal to a stable state; and
    a controller connected to said driver to adjust a width of said second voltage pulse in accordance with desired gradation,
    wherein said cholesteric liquid crystal remains in said stable state after application of said second voltage pulse in absence of any further voltage application.

11. The display apparatus as claimed in claim 10,
    wherein said cholesteric liquid crystal is chiral nematic liquid crystal, and
    wherein said liquid crystal layer is formed of chiral nematic liquid crystal and resin added thereto.

12. A display apparatus comprising:
    a liquid crystal display having a pair of plates with electrode and a liquid crystal layer retained between said plates, said liquid crystal layer including a cholesteric liquid crystal exhibiting a cholesteric phase;
    a driver connected to said liquid crystal display for applying a first voltage pulse and a plurality of second voltage pulses following said first voltage pulse,
    wherein the first voltage pulse resets said cholesteric liquid crystal by temporally setting molecules thereof to a homeotropic arrangement, and the second voltage pulses are set said cholesteric liquid crystal to a stable state; and a controller connected to said driver to adjust levels of said second voltage pulses in accordance with desired gradation, wherein said cholesteric liquid crystal remains in said stable state after application of said second voltage pulse in absence of any further voltage application.

13. The display apparatus as claimed in claim 12, wherein said cholesteric liquid crystal is chiral nematic liquid crystal, and wherein said liquid crystal layer is formed of chiral nematic liquid crystal and resin added thereto.

14. The display apparatus as claimed in claim 12, wherein said liquid crystal display is a passive matrix display having elongated scanning line paths supported on one of said plates and elongated segment line paths supported on the other of said plates as the electrodes, and the driver applies different voltage pulses to each of said scanning and segment line paths to drive said passive matrix display, and wherein said first and second voltage pulses are applied to a specified one among said scanning line paths.

15. A method of driving a liquid crystal display having a pair of plates with electrodes and a liquid crystal layer retained between said plates, said liquid crystal layer including a cholesteric liquid crystal exhibiting a cholesteric phase, said method comprising the steps of:

applying a first voltage pulse to said electrodes of said liquid crystal display to temporally set molecules of said cholesteric liquid crystal to a homeotropic arrangement thus resetting said cholesteric liquid crystal; and applying, upon elapsing of a predetermined time after applying said first voltage pulse, a second voltage pulse that has a waveform corresponding to a desired gradation to said liquid crystal display to set said cholesteric liquid crystal to a stable state corresponding to the desired gradiation in absence of any further voltage application.

16. A method of driving a liquid crystal display having a first electrode, a second electrode, and a liquid crystal layer retained between said first and second electrodes, said liquid crystal layer including a liquid crystal exhibiting a cholesteric phase, said method comprising the steps of:

(a) applying a first voltage pulse to said first electrode;

(b) applying, upon elapsing of a predetermined time after applying said first voltage pulse, a second voltage pulse to said first electrode; and (c) applying a third voltage pulse to said second electrode with controlling an application timing relative to the step (b) in accordance with desired gradation, wherein the step (a) temporally sets molecules of said liquid crystal to a homeotropic arrangement to reset said liquid crystal, and wherein said steps (b) and (c) set said liquid crystal to a stable state of the desired gradation, wherein said cholesteric liquid crystal remains in said stable state after application of said second voltage pulse and said third voltage pulse in absence of any further voltage application.

17. The method as claimed in claim 16, wherein a magnitude of the first voltage pulse is same as that of the second voltage.

18. The method as claimed in claim 16, wherein the second voltage pulse is formed of a plurality of voltage pulses.

19. The method as claimed in claim 16, wherein said first electrode is one of a plurality of scanning line electrodes, and wherein said second electrode is one of a plurality of segment electrode.

20. A display apparatus comprising:

a first electrode;

a second electrode;

a liquid crystal layer retained between said first and second electrodes, said liquid crystal layer including a liquid crystal exhibiting a cholesteric phase; and a controller connected with said first electrode and second electrode, said controller applying, to said first electrode, a first voltage pulse and a second voltage pulse upon elapsing of a predetermined time after applying said first voltage pulse, and said controller applying, to said second electrode, a third voltage pulse with controlling an application timing relative to the second voltage pulse in accordance with desired gradation, wherein the first voltage pulse temporally sets molecules of said liquid crystal to a homeotropic arrangement to reset said liquid crystal, and wherein said second voltage pulse and said third voltage pulse set said liquid crystal to a stable state of the desired gradation, wherein said cholesteric liquid crystal stays in said stable state after application of said second voltage pulse and said third voltage pulse in absence of any further voltage application.

21. The display apparatus as claimed in claim 20, wherein the second voltage pulse is formed of a plurality of voltage pulses.

22. The display apparatus as claimed in claim 20, wherein said first electrode is one of a plurality of scanning line electrodes, and wherein said second electrode is one of a plurality of segment electrode.

23. A method of driving a liquid crystal display having a liquid crystal layer between a pair of substrates, said liquid crystal including a liquid crystal exhibiting a cholesteric phase, said method comprising the steps of:

(a) applying a first voltage pulse to said liquid crystal layer; and (b) applying, upon elapsing of a waiting term after applying said first voltage pulse, a second voltage pulse to said liquid crystal layer with controlling a waveform thereof in accordance with a desired gradation, wherein the step (a) temporally sets molecules of said liquid crystal to a homeotropic arrangement to reset said liquid crystal, and wherein step (b) tempts said liquid crystal to a stable state of the desired gradation, wherein said liquid crystal is capable of remaining in said stable state after application of said second electrical field in absence of any further electrical field application.

24. The method as claimed in claim 23, wherein the desired tone is selected from a least two tones, and wherein the stable state is selected from at least two states optically different each other.

25. The method as claimed in claim 23, wherein the desired tone is selected from at least three tones, and wherein the stable state is selected from at least three states optically different each other.

26. The method as claimed in claim 25, wherein a time duration of the waiting term is not changed regardless of any one of the at least three tones.

27. The method as claimed in claim 23, wherein said second voltage pulse includes a plurality of voltage pulse signals.

28. The method as claimed in claim 27, wherein an amplitude of at least one of the voltage pulse signals is controlled in accordance with the desired tone.

29. The method as claimed in claim 27, wherein no voltage is applied to the liquid crystal between any one of the time intervals of the voltage pulse signals.

30. The method as claimed in claim 27, wherein a waveform of at least one of the voltage signals is controlled in accordance with the desired tone.

31. The method as claimed in claim 23, wherein said second voltage pulse includes at least one voltage pulse signal.

32. The method as claimed in claim 31, wherein at least one of an amplitude of the at least one voltage pulse and a pulse width of the at least one voltage pulse signal is controlled in accordance with the desired tone.

33. A display apparatus comprising:

a liquid crystal display including a pair of substrates and a liquid crystal layer retained between said pair of substrates, said liquid crystal layer including a liquid crystal exhibiting a cholesteric phase; and a controller connected with said liquid crystal display, said controller applying a first voltage pulse to said liquid crystal layer, said controller further applying, upon elapsing of a waiting term after applying said first voltage pulse, a second voltage pulse with controlling a waveform thereof in accordance with desired gradation, wherein the first voltage pulse temporarily sets molecules of said liquid crystal to a homeotripic arrangement to reset said liquid crystal, and wherein said second voltage pulse tempts said liquid crystal to a stable state of the desired gradation, wherein said liquid crystal is set in said stable state after application of said second voltage pulse, and wherein said liquid crystal is capable of remaining in said stable state after being set in said stable in absence of any further application.

34. The display apparatus as claimed in claim 33, wherein the desired tone is selected from at least two tones, and wherein the stable state is selected from at least two states optically different each other.

35. The method as claimed in claim 33, wherein the desired tone is selected from at least three tones, and wherein the stable state is selected from at least three states optically different each other.

36. The method as claimed in claim 35, wherein a time duration of the waiting term is not changed regardless of any one of the at least three tones.

37. The method as claimed in claim 33, wherein said second voltage pulse includes a plurality of voltage pulse signals.

38. The method as claimed in claim 37, wherein an amplitude of at least one of the voltage pulse signals is controlled in accordance with the desired tone.

39. The method as claimed in claim 37, wherein no voltage is applied to the liquid crystal between any one of the time intervals of the voltage pulse signals.

40. The method as claimed in claim 37, wherein a waveform of at least one of the voltage signals is controlled in accordance with the desired tone.

41. The method as claimed in claim 33, wherein said second voltage pulse includes at least one voltage pulse signal.

42. The method as claimed in claim 41, wherein at least one of an amplitude of the at least one voltage pulse and a pulse width of the at least one voltage pulse signal is controlled with the desired tone.

43. A display apparatus comprising:

a liquid crystal display including a pair of substrates and a liquid crystal layer retained between said pair of substrates, said liquid crystal layer including a liquid crystal exhibiting a cholesteric phase; and a controller connected with said liquid crystal display, said controller applying, in a first time period, a first voltage pulse to said liquid crystal layer, said controller further applying, in a second time period that is subsequent to the first time period, a second voltage pulse with controlling a waveform thereof in accordance with a desired level of an optical scale that comprises at least two levels, wherein the first voltage pulse is for resetting said liquid crystal to a transparent state, and wherein said second voltage pulse is for setting said liquid crystal to a stable state that corresponds to the desired level, wherein said liquid crystal is set in said stable state after the application of said second voltage pulse, wherein said liquid crystal is capable of remaining on said stable state after the set in absence of any further voltage application.

44. A display apparatus as claimed in claim 43, wherein the optical scale comprising at least three levels.

45. A display apparatus as claimed in claim 44, wherein said controller controlling a pulse width of the second voltage pulse in accordance with the desired level.

46. A display apparatus as claimed in claim 44, wherein said controller controlling an amplitude of the second voltage pulse in accordance with the desired level.

* * * * *